(12) United States Patent
Appavoo et al.

(10) Patent No.: US 7,533,377 B2
(45) Date of Patent: May 12, 2009

(54) ACHIEVING AUTONOMIC BEHAVIOR IN AN OPERATING SYSTEM VIA A HOT-SWAPPING MECHANISM

(75) Inventors: Jonathan Appavoo, Yorktown Heights, NY (US); Marc Alan Auslander, Millwood, NY (US); Kevin Kin-Fai Hui, Kitchener (CA); Orran Yaakov Krieger, Newton, MA (US); Dilma Menezes Da Silva, White Plains, NY (US); Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 10/673,587

(22) Filed: Sep. 29, 2003

(65) Prior Publication Data

US 2005/0071811 A1    Mar. 31, 2005

(51) Int. Cl.
    G06F 9/44       (2006.01)
    G06F 15/177     (2006.01)
(52) U.S. Cl. .......................................... 717/168; 713/2
(58) Field of Classification Search ............ 717/108, 717/110, 128–148, 168; 719/314, 321, 328–332; 714/4, 5, 10; 718/100–107; 711/114, 152, 711/200, 202; 710/260, 302; 713/2
    See application file for complete search history.

(56) References Cited

U.S. PATENT DOCUMENTS 5,727,209 A * 3/1998 Slingwine et al. ........... 718/102

6,219,690 B1 * 4/2001 Slingwine et al. ........... 718/102
7,117,498 B2 * 10/2006 Li ............................... 718/102
7,143,410 B1 * 11/2006 Coffman et al. ............. 718/100

OTHER PUBLICATIONS

M. Makpangou, et al., "Fragmented Objects for Distributed Abstractions", *Advances in Distributed Systems. IEEE*, pp. 1-27; Oct. 1991.
Dylan McNamee, et al., "Specialization Tools and Techniques for Systematic Optimization of System Software", *ACM Transactions on Computer Systems*, vol. 19, No. 2, pp. 217-251; May 2001.

(Continued)

*Primary Examiner*—Tuan Anh Vu
(74) *Attorney, Agent, or Firm*—Scully, Scott, Murphy & Presser, P.C.; Daniel P. Morris, Esq.

(57) ABSTRACT

Systems, especially operating systems, are becoming more complex to the point where maintaining them by humans is becoming nearly impossible. Many corporations have recognized this trend and have begun investing in autonomic technology. Autonomic technology allows a piece of software to monitor, diagnose, and repair itself. This can be used for improved performance, reliability, maintainability, security, etc. Disclosed herein is a mechanism to allow operating systems to hot swap a piece of operating system code, while continuing to offer to the user the service which that code is providing. This can be used, for examples, to increase the performance of an application or to fix a detected security hole live without bringing the machine down. Some autonomic ability will be mandatory in next generation operating system for without it they will collapse under their own complexity. The invention offers a key component of being able to achieve autonomic computing.

24 Claims, 3 Drawing Sheets

OTHER PUBLICATIONS

J. Magee, et al., "A Constructive Development Environment for Parallel and Distributed Programs", *In Proceedings of the Second International Workshop on Configurable Distributed Systems,* Pittsburgh, Pennsylvania, Mar. 1994.

P.E. McKenney, et al., "Read-Copy Update: Using Execution History to Solve Concurrency Problems", *International Conference on Parallel and Distributed Computing and Systems;* 1998.

"Distributed Computing Environment", *Open Software Foundation;* An Overview—Jan. 1992.

B.N. Bershad, et al. "Extensibility, Safety and Performance in the SPIN Operating System", *Proceedings of the 15th Symposium on Operating System Principles,* Copper Mountain, CO, pp. 267-284; Dec. 1995.

D.R. Engler, et al., "Exokernel: An Operating System Architecture for Application-Level Resource Management", *In Proc. 15th ACM SOSP,* Copper Mountain, CO, USA, pp. 251-266; Dec. 1995;G.

Hjálmtýsson, et al., "Dynamic C++ Classes A Lightweight Mechanism to Update Code in a Running Program", *Proceedings of the USENIX Annual Technical Conference,* New Orleans, Louisiana; Jun. 1998.

M. Hicks, et al., "Dynamic Software Updating", *In Proceedings of the ACM SIGPLAN Conference on Programming Language Design and Implementation,* pp. 13-23; Jun. 2001.

P. Homburg, et al., "An Object Model for Flexible Distributed Systems", *In Proceedings 1st Annual ASCI Conference,* pp. 69-78, Heijen, The Netherlands; May 1995.

M. Seltzer, et al., "An Introduction to the Architecture of the VINO Kernel", *Technical Report TR 34-94, Harvard University Computer Science;* Nov. 1994.

R. Unrau, et al., "Hierarchical Clustering: A structure for Scalable Multiprocessor Operating System Design", *Technical Report 268, Computer Systems Research Institute, University of Toronto;* 1993.

Z. Yang, et al., "CORBA: A Platform for Distributed Object Computing (A State-of-the-Art Report on OMG/CORBA)", *ACM Operating Systems Review,* vol. 30, No. 2, pp. 4-31; Apr. 1996.

Sun Microsystems, Inc., Java Remote Method Invocation-Distributed Computing for Java, White Paper; Jun. 2002; and.

C. Pu, et al., "Optimistic Incremental Specialization: Streamling a Commercial Operating System", *In Proceedings of the 15$^{th}$ ACM Symposium on Operating Systems Principles (SOSP'95),* pp. 314-324, Dec. 1995.

\* cited by examiner

ACHIEVING AUTONOMIC BEHAVIOR IN AN OPERATING SYSTEM VIA A HOT-SWAPPING MECHANISM

BACKGROUND OF THE INVENTION

1. Field of the Invention

This invention relates to the field of autonomic computing and operating systems. More specifically, this invention relates to a mechanism for hot-swapping code managing operating systems resources while providing continuity of that service to applications.

2. Background Art

Operating systems are large and complex, expected to run across a varied set of hardware platforms, stay up for long periods of time, stay up to date with the latest fixes, and serve an increasingly divergent set of application workloads. In the past, operating systems programmers have used several approaches to attempt to achieve some of these goals. Linux, for example, supports the ability to shut down a driver, load a new one, and start it up without having to reboot the system. Microsoft Windows created a Hardware Abstraction Layer to support running across different platforms. Programmers have used adaptive algorithms to attempt to adjust to varying application workloads. For some specific applications, programmers have been able to specially design hot-swapping approaches. None of these solutions address all the issues, and even the issues they do address are not solved for the general case.

One approach, mentioned above, is referred to as hot-swapping, which is to change, or hot-swap, operating system code while the system is still actively managing the resources for which the new, hot-swapped code is intended. In addition to solving the above-mentioned problems, because of the size and complexity of the state-of-the-art operating systems, greater maintainability is needed. Hot swapping not only solves the above-mentioned issues but addresses the need for maintainability as well.

Although there is a large body of prior work focusing on the downloading and dynamic binding of new components, there has been less work on swapping of transparent scalable components in an active system. For instance, "Dynamic C++ Classes: A Lightweight Mechanism to Update Code in a Running Program," by Gisli Hjalmtysson and Robert Gray, Annual USENIX Technical Conference, June 1998, pps 65-76, USENIX Association (*Hjalmtysson and Gray*), describes a mechanism for updating C++ objects in a running program, but, in the disclosed system, client objects need to be able to recover from broken bindings due to an object swap and retry the operation, so the mechanism is not trasparent to client objects. Moreover, this procedure does not detect quiescent state, and old objects continue to service prior calls while the new object begins to service new calls.

Another procedure is disclosed in "Optimistic Incremental Specialization: Streamlining a Commercial Operating System," by Calton Pu, Tito Autrey, Andrew Black, Charles Consel, Crispin Cowan, Jon Inouye, Lalshmi Kethana, Jonathan Walpole and Ke Zhang, ACM Symposium on Operating System Principles, Copper Mountain Resort, CO, Dec. 3-6, 1995, Operating Systems Review, vol 29, no 5 (Pu, et al.). This reference describe a replugging mechanism for incremental and optimistic specialization, but the reference assumes there can be at most one thread executing in a swappable module at a time. In later work, that constraint is relaxed but does not scale.

In general, the prior art work described herein can be viewed as part of widespread research efforts to make operating systems more adaptive and extensible as in SPIN, Exokernel, and VINO. These systems are unable to swap entire components, but rather just provide hooks for customization. Several people have also done work on adding extensibility to both applications and systems. CORBA, DCE, and RMI are all application architectures that allow components to be modified during program execution, but these architectures do not address the performance or complexity concerns present in an operating system.

There has been work to make operating systems more extensible. Other work has attempted to add hot-swapping capability at the application layer. However, no work provides a generic hot-swapping capability for operating systems that allows them to activate new code without stopping the service (and performing effectively under a varying set of workloads, while ensuring continuous availability).

SUMMARY OF THE INVENTION

An object of this invention to provide a mechanism for hot-swapping active operating system code.

Another object of the invention is to allow new code, which is has been downloaded to fix or upgrade a particular service, to be enabled and activated in a computer operating system without having to bring down the system or the service.

A further object of the invention is to provide a scalable method for swapping in highly dynamic, multi-threaded, multiprocessor system.

Another object of the invention is to provide maintainable well-performing code for a divergent set of applications by enabling a decomposition into individual, simpler components to be written for each application need which can be hot-swapped in when needed.

An object of this invention is to provide an operating system with the capability of performing autonomic operations by hot swapping parts of itself that are more suited to the performance or functional needs of the current application set.

These and other objectives are attained with a method and system for hot swapping code in a computer system. The computer system uses an operating system to provide access to hardware resources via a first code component, and the method and system of this invention may be used to replace that first code component with a new code component while the computer operating system remains active and while that operating system provides continual availability to applications of the hardware resources. The method comprises the steps of identifying references to the first code component, and replacing the identified references to the first component code with references to the new source code component.

The preferred embodiment of the invention, described in detail below, employs a mechanism for performing a hot-swap, including how to establish a quiescent state, how to transfer the state between the old component and the new component safely and efficiently, and how to swap all of the outstanding references held by the clients to the old component so that these references now point to the new component. Efficiently achieving quiescence is accomplished by tracking when threads are created and destroyed and the components they have entered. State transfer occurs via a best negotiated protocol between the old and new component. Finally, using an object translation table, all calls to the old component are rerouted to the new component.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
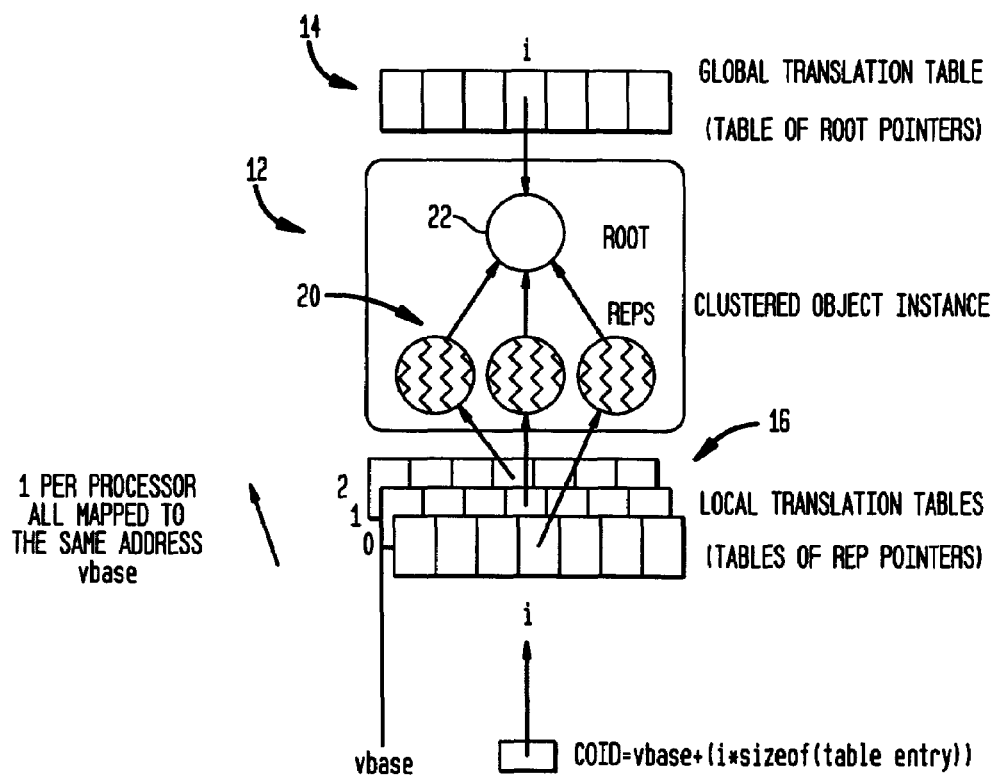
FIG. 1 illustrates a Clustered Object instance and associated transaction tables.

The present invention is not limited to the following described embodiment. This implementation demonstrates the advantages of using the invention. To hot swap code, the system must be able to identify and encapsulate the code and data for a swappable component. There are several potential ways to achieve this. The preferred embodiment uses an object-oriented model that facilitates the process of modularizing the code. In this embodiment, clustered objects are used for achieving objects with well-defined code and data boundaries on multiprocessors. Clustered objects are discussed in "Hierarchical Clustering: A Structure for Scalable Multiprocessor Operating System Design," by R. C. Unrau, O. Krieger, B. Gamsa and M. Stumm, Journal of Supercomputing, pp 105-134, 1995, vol 9, no. 1, (Unrau, et al.). Although the preferred implementation of this invention is in C++ in a modular operating system, these techniques can be applied to other operating systems and languages with the appropriate restructuring to isolate the components that need to be hot-swapped.

Clustered Object Description

To facilitate understanding the hot-swapping method of this invention, it may be helpful to first describe the basic infrastructure of clustered objects. Clustered Objects support distributed designs while preserving the benefits of a component based approach. Collections of C++ classes are used to define a Clustered Object and run-time mechanisms are used to support the dynamic aspects of the model. Clustered Objects are conceptually similar to design patterns such as facade, however, they have been carefully constructed to avoid any shared front end, and are primarily used for achieving data distribution. Some distributed systems have explored similar object models. Such distributed systems are disclosed, for instance, in "An Object Model for Flexible Distributed Systems," by P. Homburg, L. van Doom, M. van Steen, A. S. Tanenbaum and W. de Jonge, Vrije Universiteit, First Annual ASCI Conference, Heijen, Netherlands, May, 1995, pps 69-78 (Homburg, et al); and "Fragmented Objects for Distributed Abstractions," by M. Makpangou, Y. Gourhant, J.-P. Le Narzu, M Shapiro, Readings in Distributed Computing Systems, IEEE Computer Society Press, 1994, Thoman L. Casavant and Mukesh Singhal, pp 170-186, Los Alamitos, Calif. (Makpangou, et al.).

Each Clustered Object is identified by a unique interface that every implementation conforms to. Preferably, the present invention uses a C++ pure virtual base class to express a component interface. An implementation of a component is comprised of two portions: a Representative definition and a Root definition. These are expressed as separate C++ classes.

The Representative definition of a Clustered Object defines the per-processor portion of the Clustered Object. An instance of a Clustered Object Representative class is called a Rep of the Clustered Object instance. The Representative class implements the interface of the Clustered Object, inheriting from the Clustered Object's interface class. The Root class defines the global portions of an instance of the Clustered Object. Every instance of a Clustered Object has exactly one instance of its Root class that serves as the internal central anchor or root of the instance. Each Rep has a pointer to the Root of the Clustered Object instance it belongs to. As such, the methods of a Rep can access the shared data and methods of the Clustered Object via its root pointer.

At runtime, an instance of a given Clustered Object is created by instantiating an instance of the desired Root class. The client code is not actually aware of this fact. Rather, a static Create method of the Rep class is used to allocate the root. Instantiating the Root establishes a unique Clustered Object Identifier (COID) that is used by clients to access the newly created instance. To the client code, a COID appears to be a pointer to an instance of the Rep Class. To provide better code isolation, this fact is hidden from the client code with the macro: #define DREF(coid) (*(coid)). For example, if V is a variable holding the COID of an instance of a clustered performance counter, that has a method inc( ), a call would look like: DREF(V)->inc( ).

A set of tables and protocols are used to translate calls on a COID in order to achieve the unique runtime features of Clustered Objects. There is a single shared table of Root pointers called the Global Translation Table and a set of Rep pointer tables called Local Translation Tables. There is one Local Translation Table per processor. The virtual memory map for each processor is set up so that a Local Translation Table appears at address vbase on each processor but is backed by different physical pages. This allows the entries of the Local Translation Tables, which are at the same virtual address on each processor, to have different values on each processor. Hence, the entries of the Local Translation Tables are per-processor despite only occupying a single range of fixed addresses.

When a Clustered Object is allocated, its root is instantiated and installed into a free entry in the Global Translation Table. The Translation Table entries are managed on a per-processor basis by splitting the global table into per-processor regions, of which each processor maintains a free list and only allocates from its range, avoiding synchronization or sharing. The address of the corresponding location in the Local Translation Tables address range is the COID for the new Clustered Object. The sizes of the global and local entries and tables are kept the same, allowing simple pointer arithmetic to convert either a local to global or global to local table pointer. FIG. 1 illustrates a Clustered Object instance 12 and the translation tables 14 and 16. A large focus of the Clustered Object infrastructure has been multiprocessor performance. Thus, Reps are created lazily on a given processor only once a request is made on that processor.

The map of processors to Reps 20 is controlled by the Root Object 22. A shared implementation can be achieved with a Root that maintains one Rep and uses it for every processor that accesses the Clustered Object instance. Distributed implementations can be realized with a Root that allocates a new Rep for some number, or Cluster, of processors and complete distribution is achieved by a Root that allocates a new Rep for every accessing processor. There are standard Root classes that handle these scenarios. In the case of the distributed versions, the Clustered Object implementor defines a new Root class by inheriting from one of the standard distributed Root classes, adding any shared data and methods to it as necessary.

Hot Swapping

There are a number of challenges in the design of hot-swapping infrastructure capable of dynamically switching a live or hot software component:

1. avoid adding overhead to normal method invocations;
2. avoid complicating the design of the objects that have switch capabilities;
3. ensure the switching code is scalable;
4. correctly handle in-flight requests to the object being switched;
5. avoid deadlock during the switch; and
6. guarantee integrity when transferring state from the old to the new object.

Performing a hot swap on a multiprocessor can further exacerbate these challenges as it can mean having to swap the multiple constituents of a component across multiple processors in a coordinated way.

Hot-Swapping Overview

The preferred swapping mechanism of this invention allows any Clustered Object instance to be hot-swapped with any other Clustered Object instance that implements the same interface. Moreover, swapping is transparent to the clients of the component and thus no support or code changes are needed in the clients.

The preferred procedure of this invention is as follows (and described in more detail further below):

1. instantiate the replacement Clustered Object instance;
2. establish a quiescent state for the instance to be replaced so that it is temporarily idle;
3. transfer state from the old instance to the new instance;
4. swap the new instance for the old, adjusting all references to the instance; and
5. deallocate the old instance.

There are three key issues that need to be addressed in tins design. The first issue is how to establish a quiescent state so that it is safe to transfer state and swap references. The swap can only be done when the instance state is not currently being accessed by any thread in the system. Perhaps the most straightforward way to achieve a quiescent state would be to require all clients of the Clustered Object instance to acquire a reader-writer lock in read mode before any call to the object (as done in the re-plugging mechanism described in "Specialization tools and techniques for systematic optimization of system software," by Dylan McNamee, Jonathan Walpole, Calton Pu, Crispin Cowan, Charles Krasic, Ashvin Goel, Perry Wagle, Charles Consel, Gilles Muller and Renauld Marlet, ACM Transactions on Computer Systems (TOCS), vol 19, no 2, 2001, 217-251, ACM Press (McNamee, et al.)). Acquiring this external lock in write mode would thus establish that the object is safe for swapping. However, this approach adds overhead for the common case and can cause locality problems, defeating the scalability advantages of Clustered Objects. Further, the lock could not be part of the component itself and the calling code would require changes. The preferred solution provided by this invention avoids these problems and is presented below.

The second issue is deciding what state needs to be transferred and how to transfer the state from the old component to the new one, both safely and efficiently. This invention provides a protocol that Clustered Objects developers can use to negotiate and carry out the state transfer. Although the state could be converted to some canonical, serialized form, one would like to preserve as much context as possible during the switch, and handle the transfer efficiently.

The third issue is how to swap all of the references held by the clients of the component so that the references point to the new instance. In a system built using a fully-typed language such as Java, this could be done using the same infrastructure as used by garbage collection systems. However, this would be prohibitively expensive for a single component switch, and would be overly restrictive in terms of systems language choice. An alternative would be to partition a hot-swappable component into a front-end component and a back-end component, where the front-end component is referenced (and invoked) by the component clients and is used only to forward requests to the back-end component. Then there would be only a single reference (in the front-end component) to the back-end component that would need to be changed when a component is swapped, but this adds extra overhead to the common call path. Given that all accesses to a Clustered Object go through a level of indirection, namely the Local Translation Table, the more natural way to swap references is to overwrite the entry pointers in a coordinated fashion. Several distributed systems have examined ways to dynamically configure the location of components, requiring much of the same support. One such distributed system is disclosed in "A Constructive Development Environment for Parallel and Distributed Programs," by Jeff Magee, Naranker Dulay and Jeff Kramer, International Workshop on Configurable Distributed Systems, Pittsburgh, Pa., March, 1994 (Magee, et al.).

Hot-Swapping Details

To implement the preferred swapping algorithm outlined above, a specialized Clustered Object called the Mediator Object is used during the swap. It coordinates the switch between the old and new objects, leveraging the Clustered Object infrastructure to implement the swapping algorithm. To handle the swapping of distributed Clustered Object instances with many parallel threads accessing it, the Mediator is itself a distributed Clustered Object that implements the swapping algorithm in a distributed manner by utilizing a set of worker threads.

The Mediator establishes a worker thread and Rep on each processor that the original Clustered Object instance has been accessed on. The preferred algorithm in this embodiment uses per-processor worker threads. It is possible to avoid worker threads with an event callback mechanism. The advantage of the worker thread model is that it provides an easy place to collect these operations. The disadvantage is that there is an extra thread that needs to be created. To better clarify the description, we describe the worker thread, allowing us to make easily apparent what work needs to occur by this portion of the hot-swapping infrastructure. The Mediator instance is interposed in front of the target Clustered Object instance and intercepts all calls to the original object for the duration of the swapping operation. The details of how the interposition is achieved are described below. The worker threads and Mediator Reps transit through a sequence of phases in order to coordinate the swap between the old Clustered Object instance and the new one replacing it. The Mediator Reps function independently and in parallel, only synchronizing when necessary in order to accomplish the swap. FIGS. 2-7 illustrate the phases that a Mediator Rep goes through while swapping a Clustered Object. The discussion below describes how the Mediator Reps and worker threads accomplish the swap. It may be noted that, with the example described below, the actions occur on a single processor, but in the general case these actions proceed in parallel on multiple processors.

Figure 2:
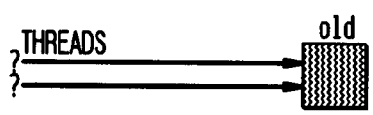
FIGS. 2 through 7 show the phases a Mediator Representative Passes through in Hot Swapping.

As represented in FIG. 2, prior to initiating the swap, the old object's Reps are invoked as normal. The first step of hot-swapping is to instantiate the new Clustered Object instance, specifying that it not be assigned a COID, and that its root is not installed into the Global Translation Table. The second step is to create a new Mediator instance and to pass both the COID of the old instance and a pointer to the Root of the new instance. The Mediator then proceeds to interpose itself in front of the old instance.

Interposing a Mediator instance in front of the old Clustered Object instance ensures that future calls temporarily go through the Mediator. To accomplish this, the Mediator instance must overwrite both the Global Translation Table entry root pointer and all the active Local Translation Table entries' Rep pointers. To swing the Global Translation Table entry Root pointer, it must ensure that no misses to the old object are in progress. As part of the standard Miss-Handling infrastructure, there is a reader-writer lock associated with each Global Translation Table entry and all misses to the entry acquire this lock in read mode. In order to atomically swing the Global Translation pointer, the associated reader-writer lock is acquired for write access, ensuring that no misses are in progress. When the lock has been successfully acquired, the Root pointer of the entry is changed to point to the Root of the Mediator and all future misses will be directed to it. The Mediator remembers the old Object's Root in order to communicate with it. During this process, there may be calls that are in flight to the old Clustered Object, and they proceed normally.

Swinging the Root is not sufficient to direct all calls to the Mediator instance. This is because some Rep pointers may already be established in the Local Translation Table entry associated with the old instance causing some calls to proceed directly to the Reps of the old instance. To handle this, the Mediator spawns a worker thread on all the processors that have accessed the old object. These threads have a number of responsibilities, but their first action is to reset the Local Translation entry on each processor back to the Default Object. This ensures that future accesses will be directed to the Mediator Object via the standard Miss-Handling process. Because the Root maintains the set of processors it has suffered a Miss on, the Mediator can query the old object's Root to determine what processors to spawn threads on.

On each Mediator miss, the Mediator Root installs a new Mediator Rep into the Local Translation Table for the processor on which the Miss occurred. The Mediator Reps are specialized C++ objects similar to the Default Object. They are designed to handle hot-swapping of any Clustered Object transparently. To do so, the Mediator Rep intercepts all calls and takes action based on the current phase of the Rep.

Figure 8:
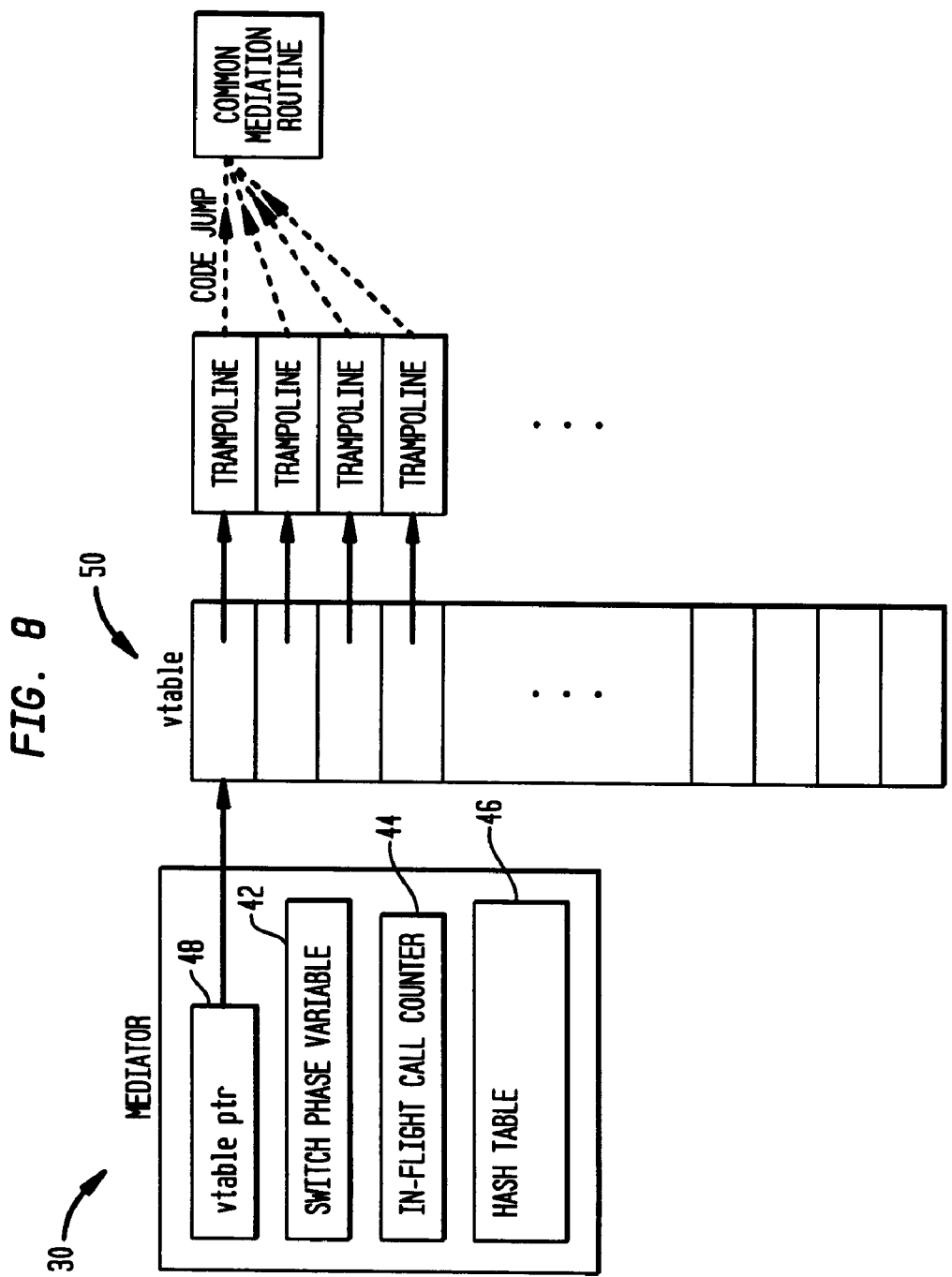
FIG. 8 shows data members of the Mediator Representative.

FIGS. 3-6 illustrate a single Mediator Rep 30 in the different phases of a swap. Once the Mediator Rep has been installed into the Local Translation Table entry, virtual method calls that would normally have called one of the functions in the original object instead call the corresponding method in the mediator. A small amount of assembly glue captures the low-level state of the call, including the parameter passing registers and return address. The actions that the Mediator Rep has to take on calls during the various phases of swapping include: forwarding and keeping a count of active calls (increment prior to forwarding the call and decrement after the forwarded call returns), selectively blocking calls, and releasing previously blocked calls. To be transparent to the clients and the target Rep when the call is being forwarded, the Mediator Rep may not alter the stack layout and hence it must only use Rep-local storage to achieve the appropriate actions. As can be seen in FIG. 8, the Mediator Rep 30 utilizes three other data members, represented at 42, 44 and 46, other than its vtable pointer 48.

The vtable 50 of the Mediator Rep, like that of the Default Object, is constructed to direct any call, regardless of its signature, to a single common mediation routine. When a phase requires that new calls be tracked and forwarded, the Mediator Rep uses an in-flight call counter to track the number of live calls. Because the counter needs to be decremented when the call completes, the Mediator must ensure that the forwarded call returns to the mediation routine prior to returning to the original caller. This means that the Mediator Rep must keep track of where to return to after decrementing its in-flight call counter on a per-thread basis. To maintain transparency, the Mediator Rep avoids using the stack by maintaining a hash table indexed by a thread id to record the return address for a given thread. The Mediator Rep also uses a data member to track the phase it is currently in. The phases are detailed in the following paragraphs.

Forward Phase

Figure 3:
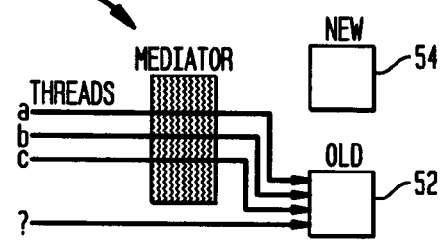
Figure 4:
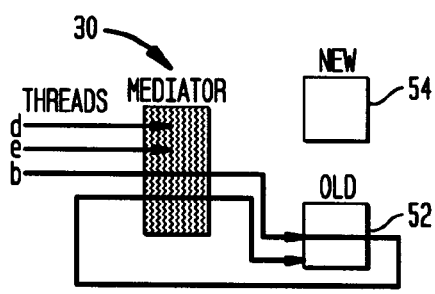
Figure 5:
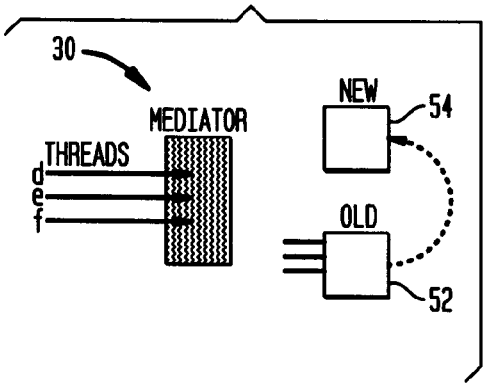

This initial phase is illustrated in FIG. 3. The Mediator 30 stays in this phase until it determines that there are no longer any threads that were started prior to the swap initiation still accessing the object. To detect this, the worker thread utilizes services similar to the Read-Copy-Update mechanism. Specifically, it is possible to determine when all threads in existence on a processor at a specific instance in time have terminated. Threads are assigned to one of two generations, represented at 52 and 54. The preferred design of this invention supports an arbitrary number of generations but only two are required for hot swapping. Each generation records the number of threads that are active and assigned to it. At any given time, one of the generations is identified as the current generation 54 and all new threads are assigned to it. To determine when all the current threads have terminated, the following algorithm is used:

```
i=0;
while (i < 2)
    if (non current generation's count == 0)
        make it the current generation
    else
        wait until count is 0 and make it current generation
    i=i+1
```

The process of switching the current generation is called a generation swap. The above algorithm illustrates that two swaps are required to establish that the current set of threads have terminated. This mechanism is timely and accurate even in the face of preemption. Preferably, the invention does not use long-lived system threads nor does it rely on blocking system-level threads. The "wait until count is 0" is implemented via a callback mechanism, avoiding a busy wait.

By waiting for all threads that were in existence when the swap was initiated to terminate, the invention may ensure that all threads accessing the old object have terminated. However, to ensure system responsiveness while waiting for these threads to terminate, new calls to the object are tracked and forwarded by Mediator Rep 30 using its in-flight call counter and hash table. The thread descriptors are also marked as being in a forwarded call in order to simplify deadlock avoidance as described below. Once the worker thread, using the generation mechanism, determines that all the untracked threads have terminated, the Mediator Rep switches to the Block phase, represented in FIG. 4. It may be noted that the Forward phase, and the transition to the Block phase, happen independently and in parallel on each processor, and no synchronization across processors is required.

Block Phase

In this phase, the Mediator 30 establishes a quiescent state, guaranteeing that no threads are accessing the old Clustered Object on any processor. To do this, each Mediator Rep establishes a quiescent state on its processor by blocking all new calls while waiting for any remaining tracked calls to complete. If all calls were indiscriminately blocked, deadlock could occur. This is because a call currently accessing the object might itself call a method of the object again. To avoid deadlock in this situation, tracked threads are not blocked. This is achieved by checking the thread descriptor to determine if the thread is in a forwarded call. This also ensures that concurrent swaps of multiple Clustered Objects do not deadlock. If a forwarded thread, during the blocked phase in one object, calls another object that is in the blocked phase, the thread will be forwarded rather than blocked, thus avoiding the potential for inter-object deadlocks. To ensure a quiescent state across all processors, the worker threads must synchronize at this point prior to proceeding. A shared data member in the Mediator root is used for this purpose.

Transfer Phase

Once the Blocked phase has completed, the Transfer phase begins. In this phase, represented in FIG. 5, the worker threads are used to export the state of the old object and import it into the new object. To assist state transfer, a transfer negotiation protocol is provided. For each set of functionally compatible components, there is a set of state transfer protocols that form the union of all possible state transfers between these components. For each component, the developers create a prioritized list of the state transfer protocols that the component supports. For example, it may be best to pass internal structures by memory reference, rather than marshaling the entire structure; however, both components must understand the same structure for this to be possible. Before initiating a hot-swap, a list is obtained from both the old and new component instances. The most desirable format, based on the two lists, is recorded by the Mediator instance. Each possible protocol is defined a priori, and a number value is assigned to the protocol. An object contains a bit vector with bits set for each of the protocols it supports. A logical and is performed on the two bit vectors. The bits remaining on indicate the protocols that both objects support. The most preferred protocol may now be easily determined by finding the most significant bit. Once the protocol is determined, the actual data transfer is carried out in parallel by the worker threads. The worker threads request the state from the old object in the format that was recorded in the Mediator instance and pass it to the new object.

Complete Phase

Figure 6:
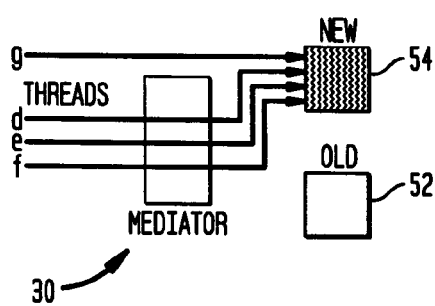
Figure 7:
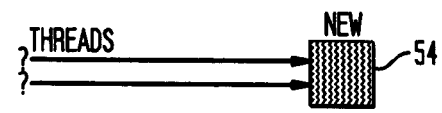

After the state transfer, the worker threads again synchronize so that one may safely swing the Global Translation Table entry to the Root of the new Clustered Object. All the worker threads then cease call interception by storing a pointer to the new Clustered Object's Reps into the Local Translation Table entries so that future calls go directly to the new Clustered Object. The worker threads then resume all threads that were suspended during the Block phase and forward them to the new Object as shown in FIG. 6. The worker threads deallocate the original object and the mediator and then terminate, as represented in FIG. 7.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. In a computer system using an operating system to provide access to hardware resources, wherein said operating system provides access to said hardware resources via a first code component, a method of replacing said first code component with a new code component while said operating system remains active and while said operating system provides continual availability to the hardware resources by applications operational in the computer system, and while said application call to said first component to perform defined functions, the method comprising using the computer system for:

instantiating an instance of a new code component to replace said first code component;
instantiating a mediator object;
initiating a swapping operation;
for the duration of the swapping operation, using the mediator object to intercept calls from the applications requesting the first code components to perform the defined functions, and using the mediator object to perform the requested functions;
establishing a quiescent state for the first code component;
transferring state from the first code component to the new code component; and
swapping the new code component for the first code component including the steps of:
identifying references to said first code component;
replacing the identified references to said first code component with references to said new code component; and
deallocating the first code component.

2. A method according to claim 1, wherein the method is implemented transparently to said applications.

3. A method according to claim 1, wherein the method is scalable.

4. A method according to claim 1, wherein said computer system comprises a multiprocessor system, which comprises a plurality of processors, and said method is implemented across each of said processors independently.

5. A method according to claim 1, wherein the replacing step includes the steps of:

transferring said identified references at said established quiescent state from the first code component to the new code component; and
after transferring said identified references to the new code segment at said established quiescent state, swapping the first code component with the new code component.

6. A method according to claim 1, wherein the step of identifying references includes the steps of:

separating the first code component into objects; and
grouping said objects into a table, and arranging said table to identify said references to said objects, which identified references to said objects are entered in the table.

7. A method according to claim 1, wherein:

the establishing step includes the step of:
establishing a quiescent state for the first code component, without locking the first code component, by tracking active threads to the first code component, and identifying the active threads as said identified references; and
the replacing step includes the steps of:
transferring said identified references, during the quiescent state, from the first code component to the new code component; and after transferring said identified references, swapping the first code component with the new code component.

8. A method according to claim 1, wherein the replacing step includes the steps of:
establishing a quiescent state for the first code component that includes the identified references;
transferring the identified references at the quiescent state from the first code component to the new code component by providing an infrastructure that operates to negotiate a best transfer algorithm; and
after transferring said identified references at the quiescent state, swapping the first code component with the new code component.

9. A method according to claim 1, wherein:
the step of identifying references includes the steps of separating the first code component into objects, and
grouping said objects into a table, and arranging said table to identify said references to said objects, which identified references to said objects are entered in the table; and
the replacing step includes the steps of
establishing a quiescent state for the first code component that includes said identified references;
transferring said references identified to said objects for the first code component to the new code component by providing an infrastructure to negotiate a best transfer algorithm; and
after transferring said references to the new code segment, swapping the first code component with the new code component.

10. A system for swapping code in a computer system including an operating system, said operating system including at least one code component and providing continual availability of hardware resources by applications operational in the computer system, the system comprising one or more processors configured for:
instantiating an instance of a new source code component to replace said at least one code component;
instantiating a mediator object;
initiating a swapping operation;
for the duration of the swapping operation. using the mediator object to intercept calls from the applications requesting the first code components to perform the defined functions, and using the mediator object to perform the requested functions;
establishing a quiescent state for the at least one code component; transferring state from the at least one code component to the new source code component; and
swapping the new source code component for the at least one code component, including:
identifying, while said operating system is active and providing continual access to said resources, references to the at least one code component of the operating system; and
transferring the identified references to the new source code component, while said operating system is active and providing continual access to said resources, and then executing the swapping.

11. A system according to claim 10, wherein the system operates transparently to said applications and the system is scalable.

12. A system according to claim 10, wherein said computer system comprises a multiprocessor system, which comprises a plurality of processors, and said method is implemented across each of said processors independently.

13. A system according to claim 10, wherein the transferring is done by:
transferring said references at the established quiescent state from the at least one code component to the new code component; and
means for swapping the at least one code component with the new code component after said identified references have been transferred.

14. A system according to claim 10, wherein the identifying references is done by:
separating the at least one code component into objects; and
grouping said objects into a table, and arranging said table to identify said references to said objects, which identified references to said objects are entered in the table.

15. A system according to claim 10, wherein the transferring is done by:
establishing a quiescent state for the at least one code component, without locking the at least one code component, by tracking active threads to the at least one code component, and identifying the active threads as said identified references;
transferring said identified references, during the quiescent state, from the at least one code component to the new code component; and
swapping the at least one code component with the new code component after said identified quiescent state references have been transferred.

16. A system according to claim 10, wherein the transferring is done by:
establishing a quiescent state for the at least one code component that includes the identified references;
transferring the identified references, during the quiescent state, from the at least one code component to the new code component by providing an infrastructure to negotiate a best transfer algorithm; and
swapping the at least one code component with the new code component after said identified references have been transferred.

17. A system according to claim 10, wherein:
the identifying references is done by:
i) separating the at least one code component into objects, and
ii) grouping said objects into a table, and arranging said table to identify said references to said objects, which identified references to said objects are entered in the table; and
the transferring is done by:
i) establishing a quiescent state for the at least one code component;
ii) transferring the identified references during the quiescent state, from the at least one code component to the new code component by providing an infrastructure to negotiate a best transfer algorithm; and
iii) swapping the at least one code component with the new code component after said identified references have been transferred.

18. A program storage device, for use with a computer system including an operating system to provide access to hardware resources, wherein said operating system provides access to said resources via a first code component, said program storage device being readable by machine, tangibly embodying a program of instructions executable by the machine to perform method steps for replacing said first code component with a new code component while said operating system remains active and while said operating system provides continual availability to said resources by applications operational in the computer system, and while said applications call to said first component to perform defined functions, the method steps comprising:

instantiating an instance of a new code component to replace said first code component;

instantiating a mediator object;

initiating a swapping operation;

for the duration of the swapping operation, using the mediator object to intercept calls from the applications requesting the first code components to perform the defined functions, and using the mediator object to perform the requested functions;

establishing a quiescent state for the first code component;

transferring state from the first code component to the new code component; and swapping the new code component for the first code component including the steps of:

identifying references to said first code component;

replacing the identified references to said first code component with references to said new code component; and deallocating the first code component.

19. A program storage device according to claim 18, wherein the method is implemented transparently to said applications, the method is scalable, and said computer system comprises a multiprocessor system, which comprises a plurality of processors, and said method is implemented across each of said processors independently.

20. A program storage device according to claim 18, wherein the replacing step includes the steps of:

establishing a quiescent state for the first code component;

transferring said identified resources at said established quiescent state from the first code component to the new code component; and after transferring said identified references to the new code segment at said established quiescent state, swapping the first code component with the new code component.

21. A program storage device according to claim 18, wherein the step of identifying references includes the steps of:

separating the first code component into objects; and grouping said objects into a table, and arranging said table to identify said references to said objects, which identified references to said objects are entered in the table.

22. A program storage device according to claim 18, wherein the replacing step includes the steps of:

establishing a quiescent state for the first code component, without locking the first code component, by tracking active threads to the first code component, and identifying the active threads as said identified references;

transferring said identified references, during the quiescent state, from the first code component to the new code component; and after transferring said identified references, swapping the first code component with the new code component.

23. A program storage device according to claim 18, wherein the replacing step includes the steps of:

transferring the identified references at the quiescent state from the first code component to the new code component by providing an infrastructure that operates to negotiate a best transfer algorithm; and after transferring the identified at said quiescent state, swapping the first code component with the new code component.

24. A program storage device according to claim 18, wherein:

the step of identifying references includes the steps of
  i) separating the first code component into objects, and
  ii) grouping said objects into a table, and arranging said table to identify references to said objects, which are entered in the table; and the replacing step includes the steps of
  i) establishing a quiescent state for the first code component that includes said identified references;
  ii) transferring said references identified to said objects for the first code component to the new code component by providing an infrastructure to negotiate a best transfer algorithm; and
  iii) after transferring said identified references, swapping the first code component with the new code component.

* * * * *